United States Patent
Fujii et al.

(10) Patent No.: US 8,072,735 B2
(45) Date of Patent: Dec. 6, 2011

(54) SOLID ELECTROLYTIC CAPACITOR, AND METHOD FOR MANUFACTURING THE SAME

(75) Inventors: Eizo Fujii, Hirakata (JP); Hayatoshi Ihara, Kyotanabe (JP); Yusuke Takahashi, Higashiosaka (JP); Takeshi Kasahara, Kadoma (JP); Katsumi Hiramatsu, Daito (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 301 days.

(21) Appl. No.: 12/443,572

(22) PCT Filed: Jun. 22, 2007

(86) PCT No.: PCT/JP2007/062632
§ 371 (c)(1),
(2), (4) Date: Mar. 30, 2009

(87) PCT Pub. No.: WO2008/041397
PCT Pub. Date: Apr. 10, 2008

(65) Prior Publication Data
US 2010/0271756 A1    Oct. 28, 2010

(30) Foreign Application Priority Data
Oct. 4, 2006  (JP) ................. 2006-273214

(51) Int. Cl.
*H01G 4/228*   (2006.01)
*H01G 9/00*    (2006.01)

(52) U.S. Cl. .............. 361/540; 361/528; 29/25.03

(58) Field of Classification Search .......... 361/540, 361/528, 523; 29/25.03
See application file for complete search history.

(56) References Cited

U.S. PATENT DOCUMENTS

| | | | | |
|---|---|---|---|---|
| 4,488,204 | A  * | 12/1984 | Beck, Jr. ............... | 361/540 |
| 6,430,034 | B2 * | 8/2002  | Sano et al. ............. | 361/528 |
| 6,625,009 | B2 * | 9/2003  | Maeda .................. | 361/528 |
| 7,135,754 | B2 * | 11/2006 | Sano et al. ............. | 257/528 |
| 2002/0163775 | A1 | 11/2002 | Maeda | |
| 2004/0098849 | A1 | 5/2004  | Maeda | |
| 2005/0162816 | A1 | 7/2005  | Fujii et al. | |

(Continued)

FOREIGN PATENT DOCUMENTS

EP    1061537 A2    12/2000

(Continued)

OTHER PUBLICATIONS

International Search Report of PCT/JP2007/062632, Mailing Date of Sep. 25, 2007.

(Continued)

*Primary Examiner* — Eric Thomas
(74) *Attorney, Agent, or Firm* — Westerman, Hattori, Daniels & Adrian, LLP

(57) ABSTRACT

A method for manufacturing a solid electrolytic capacitor, capable of joining a bolster member interposed between an anode lead and an anode lead frame to the anode lead frame with good adhesion property and high positional accuracy where a bolster member is obtained from a ladder-shaped frame such that a width of the bolster member in a direction perpendicular to a lead-out direction of an anode lead is larger than a width of an anode lead frame, and the bolster member is aligned with the anode lead frame while being chucked, and then is joined to the anode lead frame.

7 Claims, 3 Drawing Sheets

U.S. PATENT DOCUMENTS

| | | |
|---|---|---|
| 2006/0077618 A1 | 4/2006 | Fujii et al. |
| 2006/0126273 A1* | 6/2006 | Ishijima ........................ 361/540 |
| 2006/0221553 A1 | 10/2006 | Ihara |
| 2007/0159770 A1 | 7/2007 | Kuriyama |

FOREIGN PATENT DOCUMENTS

| | | |
|---|---|---|
| JP | 3-2655 U | 1/1991 |
| JP | 2001-6977 A | 1/2001 |
| JP | 2002-367862 A | 12/2002 |
| JP | 2005-244177 A | 9/2005 |
| JP | 2006-108539 A | 4/2006 |
| WO | 2005/083729 A1 | 9/2005 |

OTHER PUBLICATIONS

Korean Office Action dated Sep. 29, 2010, issued in corresponding Korean Patent Application No. 10-2007-7025864.

Chinese Office Action dated Jul. 27, 2010, issued in corresponding Chinese Patent Application No. 200780000522.X.

Japanese Office Action dated Jun. 21, 2011, issued in corresponding Japanese Patent Application No. 2006-273214.

European Search Report dated Aug. 4, 2011, issued in corresponding European Patent Application No. 07767441.4.

* cited by examiner (a)

(b)

SOLID ELECTROLYTIC CAPACITOR, AND METHOD FOR MANUFACTURING THE SAME

TECHNICAL FIELD

The present invention relates to a solid electrolytic capacitor, and a method for manufacturing the same

BACKGROUND ART

FIG. 5 is a sectional view showing a conventional solid electrolytic capacitor. Solid electrolytic capacitor includes a capacitor element (6), and an anode lead frame (71) and a cathode lead frame (72) each provided below capacitor element (6). Capacitor element (6) is coated with a synthetic resin (8). Capacitor element (6) has a structure that a dielectric oxide coating film (3), a cathode layer (4) and a cathode lead-out layer (5) are formed successively on a periphery of a valve metal sintered body (22). Herein, a valve metal denotes a metal having a dense and durable dielectric oxide coating film (3) formed by electrolytic oxidation treatment, and specific examples thereof include tantalum, niobium, aluminum, titanium and the like.

An anode lead (21) made of a valve metal protrudes from a center of sintered body (22) in a height direction. A bottom end surface of anode lead (21) is different in height from a top surface of anode lead frame (71). Therefore, a columnar bolster member (9) is interposed between anode lead (21) and anode lead frame (71) to establish an electrical connection between anode lead (21) and anode lead frame (71).

As a method for forming bolster member (9), there has been known a method disclosed in Patent Document 1. According to this method, a tantalum wire is used for establishment of a connection between an anode lead and a lead frame in a solid electrolytic capacitor. There has been also known a method disclosed in Patent Document 2. According to this method, as shown in FIG. 4, a plurality of capacitor elements (6) are attached to a carrier bar. In this state, a long nickel wire (10) enters respective anode leads (21), and then is connected to anode leads (21) by resistance welding. Thereafter, long nickel wire (10) is cut into an appropriate size.

Patent Document 1: Japanese Patent Laying-Open No. 2001-006977
Patent Document 2: Japanese Patent Laying-Open No. 2005-244177

DISCLOSURE OF THE INVENTION

Problems to be Solved by the Invention

In the foregoing methods, however, a bolster member is a columnar wire, and a contact area of the bolster member with a lead frame becomes small. Consequently, a strength of connection to the anode lead frame is weak. Further, a width of the bolster member in a direction perpendicular to a lead-out direction of an anode lead is smaller than a width of the anode lead frame. Herein, a burr is formed at a bottom side of the bolster member in a cutting process upon formation of the bolster member. For this reason, if the width of the bolster member is smaller than the width of the lead frame, as shown in FIG. 3(b), a clearance is created between bolster member (9) and anode lead frame (71), which results in deterioration of an adhesion property. Consequently, there arises a problem that a connection strength is deteriorated or a connection can not be established.

As shown in FIG. 4, the bolster members are formed simultaneously for the plurality of capacitor element. Consequently, positional adjustment can not be performed for each bolster member, and positional accuracy with respect to an anode lead frame becomes incorrect. Thus, there arises a problem in alignment for laser welding.

The present invention has been devised to solve the foregoing problems. An object of the present invention is to provide a solid electrolytic capacitor with improved positional accuracy and adhesion property between an anode lead frame and a bolster member, and a method for manufacturing the same.

Means for Solving the Problems

The present invention provides a solid electrolytic capacitor including: a capacitor element in which a dielectric oxide coating film, a cathode layer made of a solid electrolyte and a cathode lead-out layer are formed successively on a periphery of an anode body from which an anode lead is led out; an anode lead frame which is connected to the anode lead via a bolster member; and a cathode lead frame which is connected to the cathode lead-out layer. Herein, the capacitor element is coated with an exterior resin in such a manner that the anode lead frame and the cathode lead frame are bared partially. A width of the bolster member in a direction perpendicular to a lead-out direction of the anode lead is larger than a width of the anode lead frame. The bolster member is provided inside the exterior resin without being bared.

The present invention also provides a method for manufacturing a solid electrolytic capacitor, including the steps of: preparing a capacitor element in such a manner that a dielectric oxide coating film, a cathode layer made of a solid electrolyte and a cathode lead-out layer are formed successively on a periphery of an anode body from which an anode lead is led out; forming a bolster member; connecting the bolster member to an anode lead frame; connecting the anode lead to the bolster member; connecting a cathode lead frame to the cathode lead-out layer; coating the capacitor element with an exterior resin in a state that the anode lead frame and the cathode lead frame are bared partially; and dividing a frame to obtain a capacitor. Herein, in the step of forming the bolster member, a crossbar portion of a ladder-shaped frame is cut to form the bolster member. Moreover, the crossbar portion is chucked at a simultaneous timing with the cutting of the crossbar portion.

More preferably, in the step of connecting the bolster member to the anode lead frame, the bolster member is pressed against the anode lead frame while being chucked, and then is welded to the anode lead frame.

More preferably, the bolster member is connected to the anode lead frame by laser welding.

Effects of the Invention

According to the present invention, a bolster member is supplied in a form of a ladder-shaped frame, and only a crossbar portion is cut out as the bolster member. Therefore, the bolster member can be cut out from the ladder-shaped frame while being chucked. This improves usability and increases productivity.

Further, a width of the bolster member in a direction perpendicular to a lead-out direction of an anode lead is larger than a width of a lead frame. Therefore, a burr which is formed at a bottom side of the bolster member in cutting of the bolster member is positioned out of a surface of the anode lead frame. Thus, the present invention ensures an adhesion property between the anode lead frame and the bolster member, increases a connection strength, and improves ESR characteristics.

In addition, the bolster member is cut and, almost simultaneously, is connected to the anode lead frame while being chucked. Thus, the present invention allows positional adjustment, ensures positional accuracy between the bolster member and the lead frame more correctly, solves a problem in alignment for laser welding, and improves welding accuracy and welding strength.

BEST MODE FOR CARRYING OUT THE INVENTION

Hereinafter, description will be given of one embodiment of the present invention.

FIG. 1 is a sectional view showing a solid electrolytic capacitor according to one embodiment of the present invention. This solid electrolytic capacitor includes a capacitor element (6), and a bolster member (9) interposed between capacitor element (6) and an anode lead frame (71). Capacitor element (6) is coated with an exterior resin (8) in a state that a bottom surface of anode lead frame (71) and a bottom surface of a cathode lead frame (72) are bared.

The solid electrolytic capacitor is manufactured through the following steps. First, capacitor element (6) is prepared as follows. That is, a dielectric oxide coating film (3), a cathode layer (4) made of a solid electrolyte, and a cathode lead-out layer (5) made of silver paste or carbon are formed successively on a periphery of a valve function metal sintered body (22) from which an anode lead (21) is led out.

Herein, a valve function metal denotes a metal having a dense and durable dielectric oxide coating film (3) formed by electrolytic oxidation treatment, and examples thereof include tantalum, niobium, aluminum, titanium and the like. Moreover, specific examples of the solid electrolyte include conductive polymers such as manganese dioxide, TCNQ (7,7,8,8-tetracyanoquinodimethane) complex salt, polypyrrole, polythiophene and polyaniline.

Next, bolster member (9) is formed as follows. That is, a crossbar portion of a ladder-shaped frame (11) is cut as shown in FIG. 6. As shown in FIG. 2(a), more specifically, ladder-shaped frame (11) is cramped with an upper cutting die (121) and a lower cutting punch (122) in a vertical direction. As shown in FIG. 2(b), next, ladder-shaped frame (11) is cut in such a manner that lower cutting punch (122) moves upward.

Simultaneously with the formation of bolster member (9), bolster member (9) is chucked by a vertically movable chuck (13). Herein, a width of the punch for forming bolster member (9) is larger than a width of anode lead frame (71). Moreover, an initial position of chuck (13) may be spaced away from ladder-shaped frame (11) or may come into contact with ladder-shaped frame (11). Alternatively, bolster member (9) may be formed in such a manner that upper cutting die (121) moves downward. As described above, only the crossbar portion corresponding to the bolster member is cut out from the ladder-shaped frame. This improves usability and increases productivity.

Upon formation of bolster member (9), further, there is a minute clearance between upper cutting die (121) and lower cutting punch (122), which forms a burr (91) at a bottom side of bolster member (9).

Next, bolster member (9) is connected to anode lead frame (71) as follows. First, bolster member (9) obtained by the cutting is aligned with anode lead frame (71) and is placed on a top surface of anode lead frame (71) while being chucked. Then, a laser is applied to bolster member (9) and anode lead frame (71).

Herein, bolster member (9) is placed on anode lead frame (71) such that burr (91) formed at the bottom side of bolster member (9) is not placed on the top surface of anode lead frame (71) as shown in FIG. 3(b), in other words, burr (91) formed at the bottom side of bolster member (9) is positioned out of anode lead frame (71) as shown in FIG. 3(a). A welding method may be resistance welding other than a method using a laser. More preferably, laser welding is used because welding of the chucked bolster member becomes mechanically simple.

Next, capacitor element (6) is connected to anode lead frame (71) having bolster member (9) joined thereto, and cathode lead frame (72). A connection method between bolster member (9) and capacitor element (6) is preferably laser welding. Thereafter, capacitor element (6) is coated with exterior resin (8) in the state that the bottom surface of anode lead frame (71) and the bottom surface of cathode lead frame (72) are bared. Thus, the solid electrolytic capacitor according to the present invention is manufactured.

Each bolster member is connected to the cathode lead frame through the foregoing steps. Therefore, the present invention facilitates the alignment of the bolster member and improves the positional accuracy. In addition, the burr formed at the bottom side of the bolster member is positioned out of the lead frame. Therefore, the present invention can provide a solid electrolytic capacitor with improved joining strength and joining reliability between a bolster member and an anode lead frame.

DESCRIPTION OF THE REFERENCE SIGNS

Figure 1:
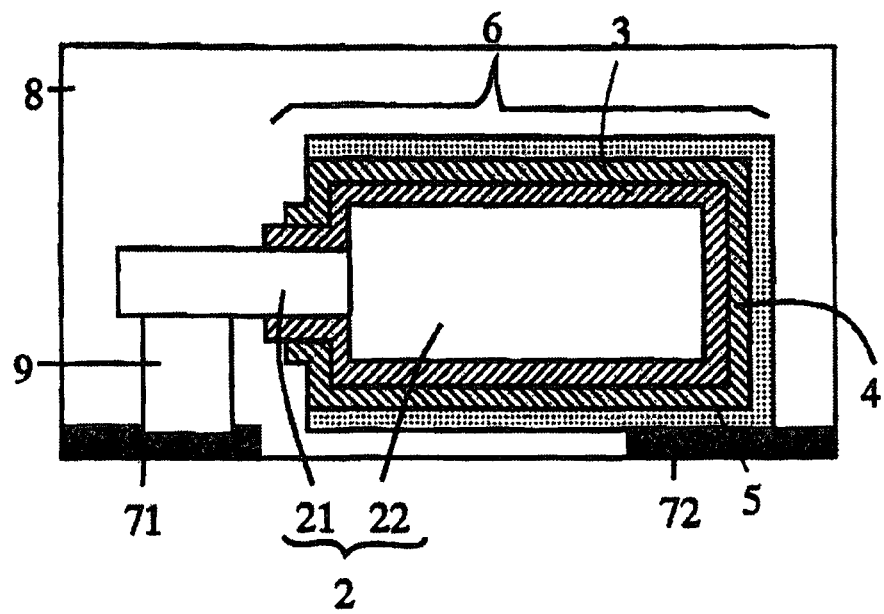
FIG. 1 is a sectional view showing a solid electrolytic capacitor according to the present invention.
Figure 2:
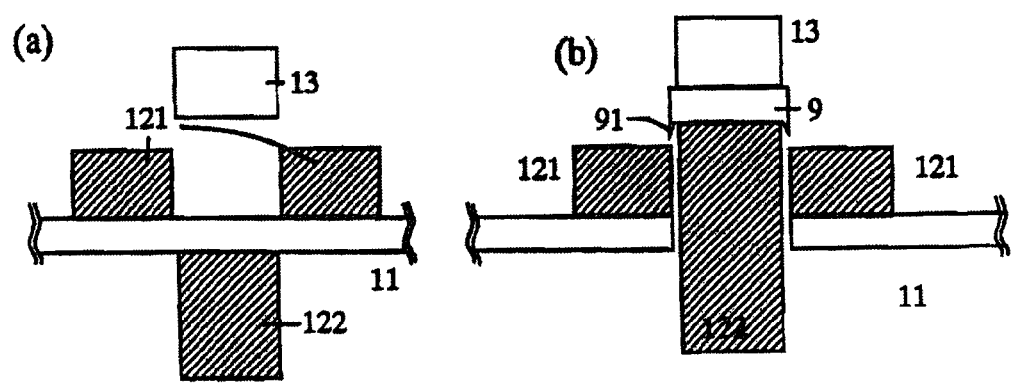
FIG. 2 each shows a method for forming a bolster member according to the present invention.
Figure 3:
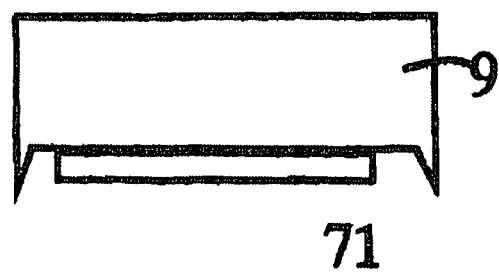
FIG. 3(a) shows a state that the bolster member according to the present invention is joined to a lead frame.
FIG. 3(b) shows a state that a conventional bolster member is joined to a lead frame.
Figure 3:
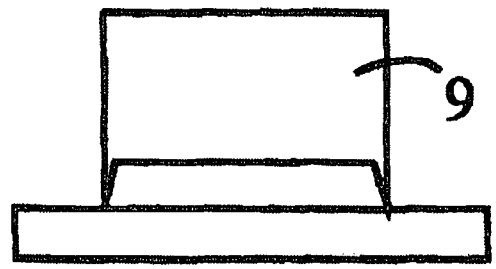
Figure 4:
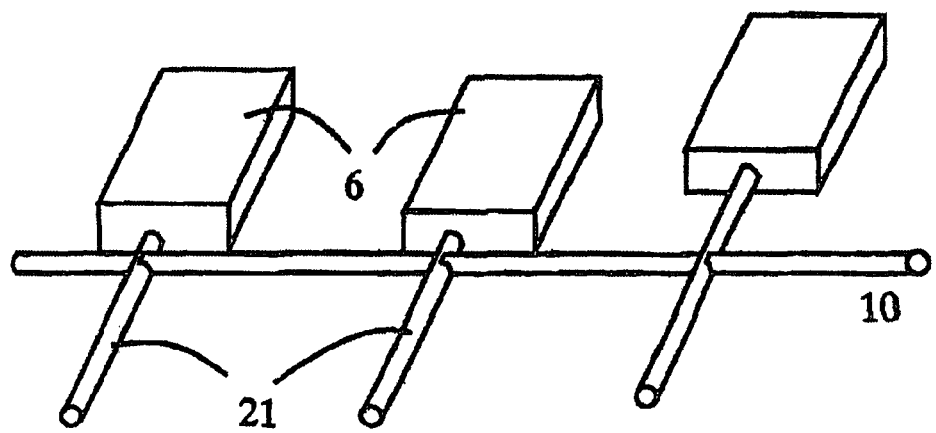
FIG. 4 shows a method for forming the conventional bolster member.
Figure 5:
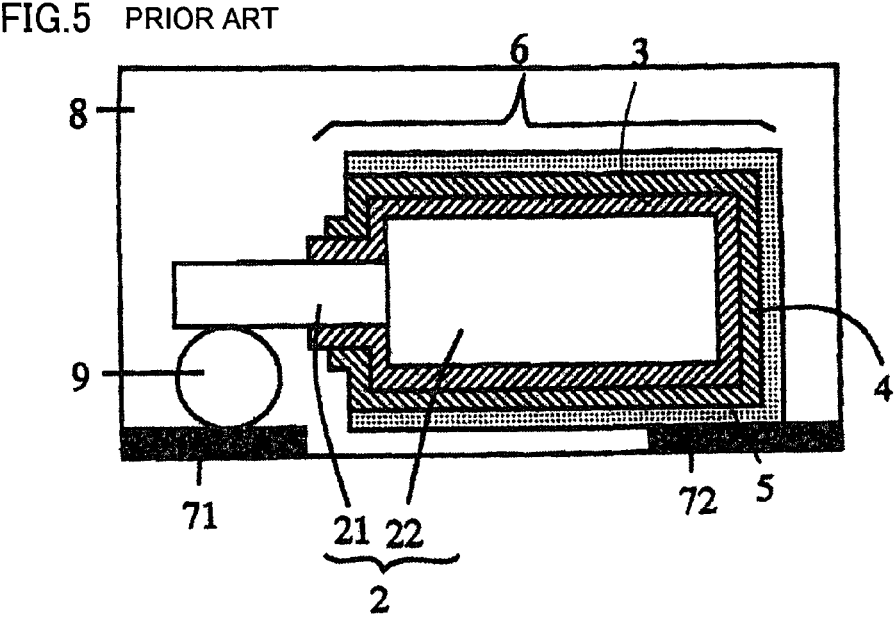
FIG. 5 is a sectional view showing a conventional solid state electrolytic capacitor.
Figure 6:
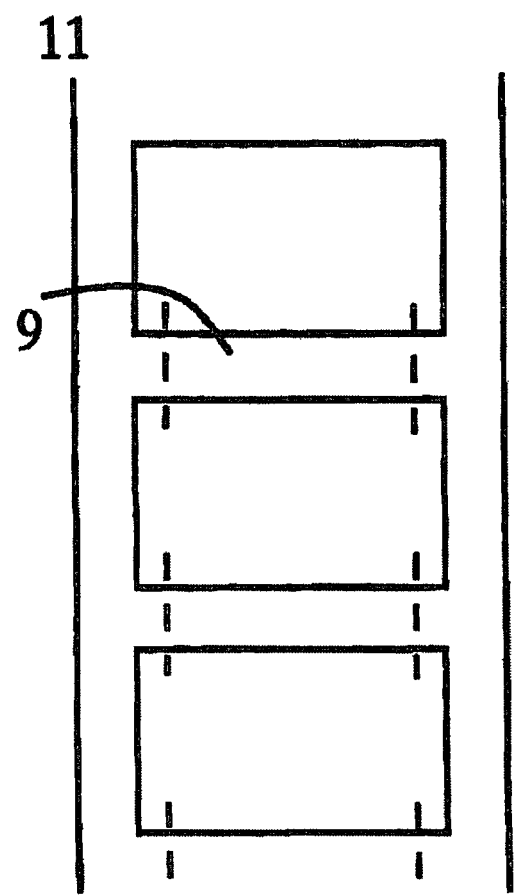
FIG. 6 shows a ladder-shaped frame for use in the present invention.

2 Anode body
22 Sintered body
21 Anode lead
3 Dielectric oxide coating film
4 Cathode layer
5 Cathode lead-out layer
6 Capacitor element
71 Anode lead frame
72 Cathode lead frame
8 Exterior resin
9 Bolster member
91 Burr
10 Nickel wire
11 Ladder-shaped frame
121 Upper cutting die
122 Lower cutting punch 13 Vertically movable chuck

The invention claimed is:

1. A solid electrolytic capacitor comprising:
a capacitor element in which a dielectric oxide coating film, a cathode layer made of a solid electrolyte and a cathode lead-out layer are formed successively on a periphery of an anode body from which an anode lead is led out;
an anode lead frame which is connected to said anode lead via a bolster member; and
a cathode lead frame which is connected to said cathode lead-out layer, wherein
said capacitor element is coated with an exterior resin in such a manner that said anode lead frame and said cathode lead frame are bared partially,
a length of said bolster member in a first direction, which is parallel to the interfacial surface between said bolster member and said anode lead frame and perpendicular to a second direction in which said anode lead is led out, is longer than a length of said anode lead frame in said first direction, and
said bolster member is provided inside the exterior resin without being bared,
wherein said bolster member has a burr at its each end of said first direction, said burr protrudes toward said anode lead frame.

2. A method for manufacturing a solid electrolytic capacitor, comprising the steps of:
preparing a capacitor element in such a manner that a dielectric oxide coating film, a cathode layer made of a solid electrolyte and a cathode lead-out layer are formed successively on a periphery of an anode body from which an anode lead is led out;
forming a bolster member;
connecting said bolster member to an anode lead frame;
connecting said anode lead to said bolster member;
connecting a cathode lead frame to said cathode lead-out layer;
coating said capacitor element with an exterior resin in a state that said anode lead frame and said cathode lead frame are bared partially; and
dividing a frame to obtain a capacitor, wherein
in the step of forming said bolster member, a crossbar portion of a ladder-shaped frame is cut to form said bolster member.

3. The method according to claim 2, wherein
in the step of forming said bolster member, the crossbar portion of the ladder-shaped frame is chucked at a substantially simultaneous timing with the cutting of the crossbar portion.

4. The method according to claims 3, wherein
said bolster member is connected to said anode lead frame by laser welding.

5. The method according to claim 2, wherein
in the step of connecting said bolster member to said anode lead frame, the bolster member is pressed against the anode lead frame while being chucked, and then is welded to the anode lead frame.

6. The method according to claim 5, wherein
said bolster member is connected to said anode lead frame by laser welding.

7. The method according to claim 2, wherein
said bolster member is connected to said anode lead frame by laser welding.

* * * * *